(12) United States Patent
Lamb et al.

(10) Patent No.: US 9,183,502 B2
(45) Date of Patent: Nov. 10, 2015

(54) RULE BASED CONTENT MODIFICATION AND INTERACTION PLATFORM

(71) Applicant: The Shadow Gang, LLC, Oak Park, IL (US)

(72) Inventors: Joshua Lamb, Oak Park, IL (US); Alexander Lemay, Chicago, IL (US); Steven E. Harshbarger, Corte Madera, CA (US)

(73) Assignee: Multipop LLC, Oak Park, IL (US)

( * ) Notice: Subject to any disclaimer, the term of this patent is extended or adjusted under 35 U.S.C. 154(b) by 306 days.

(21) Appl. No.: 13/893,316

(22) Filed: May 13, 2013

(65) Prior Publication Data

US 2014/0337259 A1  Nov. 13, 2014

(51) Int. Cl.
*G06N 5/02*  (2006.01)

(52) U.S. Cl.
CPC ................................. *G06N 5/025* (2013.01)

(58) Field of Classification Search
CPC .................... G06Q 30/0261; G06F 17/2735
USPC ................................................... 706/14
See application file for complete search history.

(56) References Cited

U.S. PATENT DOCUMENTS

2012/0151527 A1*  6/2012  Kumar et al. ................. 725/40
2014/0019225 A1*  1/2014  Guminy et al. ............ 705/14.39

* cited by examiner

*Primary Examiner* — Jeffrey A Gaffin
*Assistant Examiner* — Ola Olude Afolabi
(74) *Attorney, Agent, or Firm* — Patent Ingenuity, P.C.; Samuel K. Simpson

(57) ABSTRACT

A rule input to generate a rule is received. The rule provides an action for an event. A content experience engine generates the rule for a set of content. The content experience engine receives an interaction input based upon the set of content from the content experience configuration. The content experience engine generates an enhanced set of content based upon the rule and the interaction input.

21 Claims, 5 Drawing Sheets

500

502 — receive a rule input to generate a rule, the rule providing an action for an event 504 — process, with a content experience engine, the rule for a set of content 506 — receive, with the content experience engine, an interaction input based upon the set of content from the content experience configuration 508 — generate, with the content experience engine, an enhanced set of content based upon the rule and the interaction input

RULE BASED CONTENT MODIFICATION AND INTERACTION PLATFORM

BACKGROUND

1. Field

This disclosure generally relates to the field of computing systems. More particularly, the disclosure relates to content modification and interaction.

2. General Background

Current media systems are often limited in their ability to interact with and track audiences of the particular media. Producers provide content to audiences, but generally are unable to track the particular reactions of those audience members to such content. As a result, producers typically provide a content experience to audience members such that the content experience is often limited to the audience members watching and/or listening to the content.

SUMMARY

A system, computer program product, and method are provided. A rule input to generate a rule is received. The rule provides an action for an event. A content experience engine generates the rule for a set of content. The content experience engine receives an interaction input based upon the set of content from the content experience configuration. The content experience engine generates an enhanced set of content based upon the rule and the interaction input.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method, system, apparatus, and computer program product may be utilized to provide a rule based content modification and interaction system. The rule based content modification and interaction system is a centralized hub that may preload and run entire entertainment experiences including online content, mobile content, gaming content, social media, e-commerce, and/or the like. A content management system may be customized to interact with the rule based content modification and interaction system. Accordingly, the rule based content modification and interaction system may be utilized to generate rules and capture interactions to a set of content based upon those rules. Content that is otherwise passive may then be modified, e.g., enhanced, by the content modification and interaction system based upon the rules and the responses by audience members to the rules. Therefore, the rule based content modification and interaction system provides choice, interaction, and/or rewards to otherwise passive content.

Accordingly, the rule based content modification and interaction system allows content generators, e.g., content producers, to generate, socialize, and monetize content across multiple platforms. Further, the rule based content modification and interaction platform allows content generators to enhance their content so that the content is interactive with audience members. Such interaction allows for tracking of reactions of audience members to the content. Examples of content generators include, but are not limited to, content owners in film, television, publishing, gaming, branding, or the like. Content generators may utilize the rule based content modification and interaction system to expand distributions channels, interact with audiences, and develop revenue from interactions between audience members and the content. As an example, real world and virtual merchandise that is related to a particular entertainment experience may be sold through an e-commerce component of the rule based content modification and interaction system.

Figure 1:
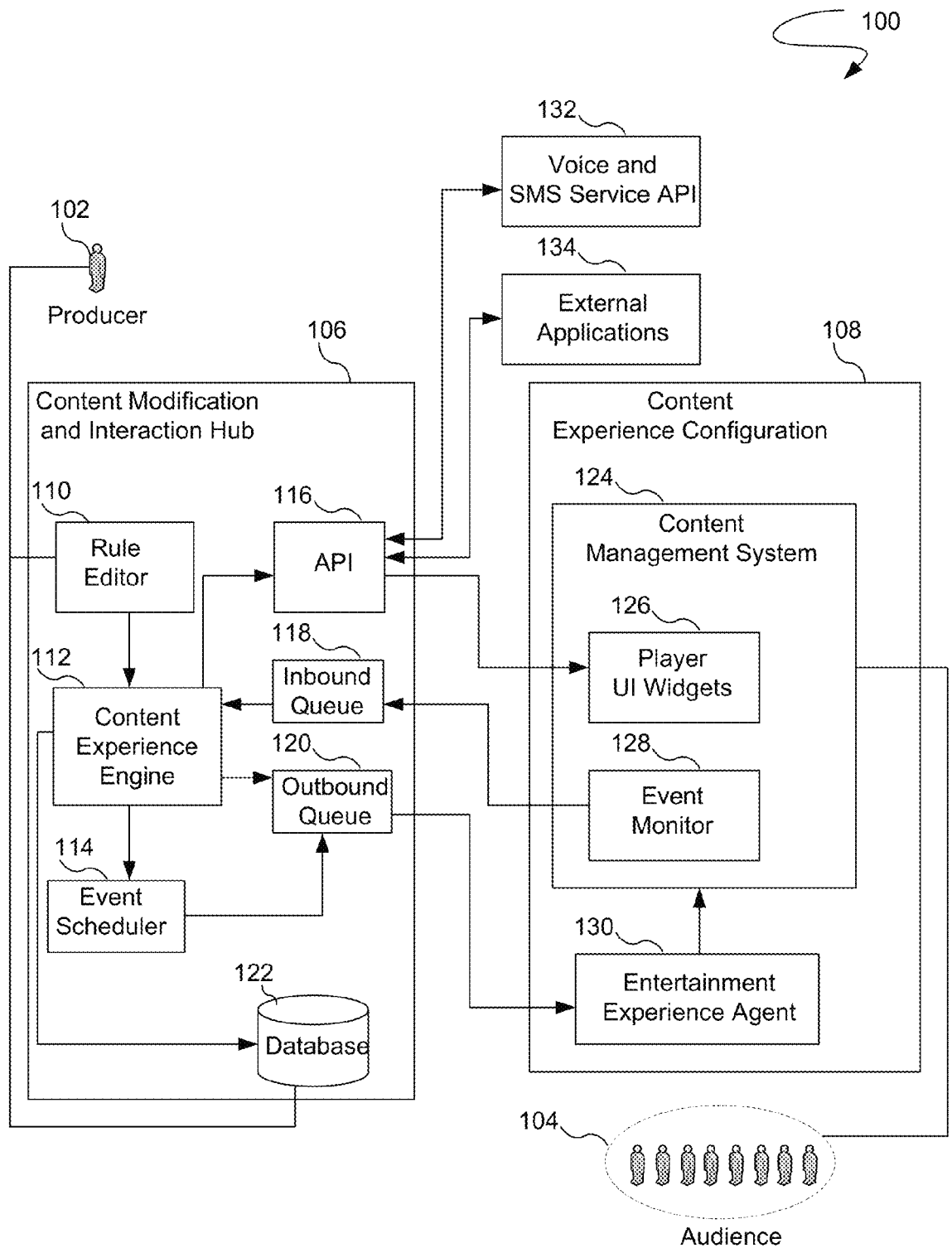
FIG. 1 illustrates a rule based content modification and interaction platform configuration.

FIG. 1 illustrates a rule based content modification and interaction platform configuration 100. The rule based content modification and interaction platform configuration 100 may be utilized to generate, aggregate, and/or enhance content. A producer 102 is able to utilize the content modification and interaction platform configuration 100 to generate, aggregate, and/or enhance content for an audience 104 of users.

The producer 102 interacts with a content modification and interaction content modification and interaction hub 106. The content modification and interaction content modification and interaction hub 106 includes a rule editor 110, a content experience engine 112, an event scheduler 114, an Application Programming Interface ("API") 116, an inbound queue 118, and outbound queue 120, and a database 122. The content modification and interaction hub 106 may maintain rules, modify content in response to events triggered by the rules, capture the interactions that an audience has with the content, and aggregate the interactions analytics. The producer 102 may then view the analytics. The analytics assist the producer 102 in generating future rules, determining incentives for players, determining possible monetization configurations, and/or the like.

The rule editor 110 allows the producer 102 to establish a set of rules for generation, enhancement, aggregation, and/or distribution of content. The content may be video, audio, games, webpages, social media pages, images, text, text messages, and/or the like. The set of rules are prepared by the producer 102 to generate and/or enhance content so that the content is interactive content, i.e., content that allows for participation from the audience 104. The rules allow the audience 104 to become active participants of the content to affect the outcome of the content rather than being passive participants.

A variety of types of rules may be utilized by the producer 102. As examples, rules may be events or incentives. Event based rules are rules that provide certain types of actions based upon the occurrence of the event. Examples of events include, but are not limited to, brand conversion events, brand referral events, code entry events, friend request events from a character in the content, friend request events to a character in the content, immersive video, message from a character in the content, message to a character in the content, internal experience content, external experience content, player registration, message event from a member of the audience 104, message event to a member of the audience 104, task event, user generated content upload event, voice input from a member of the audience 104, and/or the like. Examples of incentives included, but are not limited to, profile completion, event completion, friending, forum participation, regular login, and audience member recruitment. For instance, a player may earn an incentive for completing an event. The various rules may have various parameters. In one embodiment, a rule may have a condition that has to be met for an action associated with the rule to be performed. A variety of other types of parameters may be utilized.

The incentive events provide incentives for the occurrence of particular events. Examples of the incentive events include, but are not limited to, profile completion, event completion, friending, forum participation, regular login, and player recruitment.

The rule parameters may include a trigger, a rule configuration that varies by rule type, an incentive, an activity feed, a task list, unlocking, and classification. A trigger may be a triggering event, a triggering point balance, and a trigger delay time. Further, a rule configuration may be a character, message content, failure content, and a valid code or phrase. In addition, incentives may include reward to grant, points to grant, repeatability allowed, repeat limit, repeat interval, and limit to first player only. The activity feed may be included in a feed or may be a feed sentence template. The task list may be included in a task list or in a task sentence template. The unlocking includes pages to lock or unlock upon completion or content blocks to lock or unlock upon completion.

In one embodiment, the rule editor 110 provides a user interface through which the producer 102 is able to provide inputs for generating rules. Further, the rule editor 110 has a plurality of event definitions. The event definitions may be provided by the producer 102 or integrated within the rule editor 110 without inputs from the producer 102. The rule editor 110 processes the event definitions and provides a plurality of rules based upon the event definitions to a content experience engine 112. The content experience engine 112 generates and/or enhances content according to the plurality of rules, e.g., events or incentives, received from the rule editor 110 and messages arriving through the inbound queue 118 sent from an event monitor 128 in the a content management system 124. Accordingly, the producer 102 generates rules that may be invoked based upon player interaction. The player interaction is then provided to the content experience engine 112 so that the content experience engine 112 may modify the content based upon the rules and the player interactions in response to those rules. As a result, the content experience engine 112 allows otherwise passive content to be modified, e.g., enhanced, based upon a particular content experience of a user. For instance, a passive set of content may be gamified so that the content is enhanced with gaming aspects for a particular user. For instance, the user may interact with the otherwise passive content in a game like fashion to accrue various rewards based upon completing certain events pertaining to interaction with the content. Other possible enhancements other than gaming aspects may be utilized.

In one embodiment, the content experience engine 112 then provides the rules to the event scheduler 114 if an event is triggered by a rule that states that the execution of the rule should be delayed. The event scheduler 114 performs timed event processing, i.e., schedules the events to be sent to the content experience configuration 108. In other words, the event scheduler 114 schedules the order, time, etc., when the events are sent to the content experience configuration 108. The event scheduler 114 then sends the events to an outbound queue 120. In another embodiment, the event scheduler 114 is not utilized if no delay is specified. In such an instance, the content experience engine 112 processes the rule immediately without utilizing the event scheduler 114.

The content modification and interaction content modification and interaction hub 106 sends events from the outbound queue 120 to an entertainment experience agent 130 in the content experience configuration 108. The entertainment experience agent 130 is a software module that acts on behalf of the characters in the entertainment experience. Accordingly, the entertainment experience agent 130 coordinates actions of the characters in the entertainment experience according to the events received from the outbound queue 120.

The content experience configuration 108 also has a content management system 124 that manages content for the content experience configuration 108. The content management system has player user interface widgets 126 and a player monitor 128. The user interface widgets 126 and the player monitor 128 are customizations for the content managements system 124. The customizations allow for content to be organized around members of the audience 104 rather than websites. In other words, user interface widgets 126 may be customized for particular members of the audience 104. Further, the event monitor 128 monitors the interactions of the particular members of the audience 104 with respect to the content based upon the events received from the outbound queue 120. In one embodiment, the entertainment experience agent 130 provides the events to the event monitor 128. In another embodiment, the content management system receives the events at the event monitor without the entertainment experience agent 130.

The event monitor 128 monitors the interactions with the members of the audience 104. The event monitor 128 may provide monitoring data to an inbound queue 118 of the content modification and interaction content modification and interaction hub 106. The inbound queue 118 may then provide the monitoring data to the content experience engine 112. The monitoring data may include data such as reactions by members of the audience 104 to the events. For example, the event monitor 128 may monitor an audience member's selection of a character path in an immersive video. An event may provide the audience member with reward points for selection of that particular path. Accordingly, the content experience engine 112 can tabulate the reward points upon receiving data from the event monitor 128 through the inbound queue 118 that the particular path has been selected.

The content experience engine 112 then stores the event monitoring data in a database 122. In one embodiment, the entertainment engine 112 performs various analytics on the data. For example, the content experience engine 112 can store advertising analytics based upon demographic data of members of the audience 104 and interactions of the content modification and interaction content modification and interaction hub 106 with the members of the audience 104. The database 122 may store event definitions, analytics, a list of members of the audience 104, and/or the like.

The player user interface widgets 126 may be customized through the content modification and interaction content modification and interaction hub 106. For example, the producer 102 may provide audience member point balances, i.e., incentives earned, leader boards, and/or the like to the API 116. The API 116 provides an interface based upon the received data.

The API 116 also provides an interface for a voice and SMS service API 132. Accordingly, a voice service may be utilized that is based upon the rules. Further, other external applications 134 may also utilize the API 116. The API 116 allows the producer 102 to integrate content from external applications that are not managed by the content management system 124, e.g., content in a mobile application, content in an application, content on a website, and/or the like, into the content modification and interaction hub. Accordingly, the system of the producer 102 may inform the content modification and interaction hub 106 that an audience member has provided an interaction with that system rather than the content management system 124. The data is provided by the system of the producer 102 as an input to the content experience engine 112. The input is provided through the API 116 rather than the event monitor 128 and the inbound queue 118 as with the content management system 124 that is customized with the player user interface widgets 126 and the event monitor 128 for utilization with the content modification and interaction hub 106.

Figure 2:
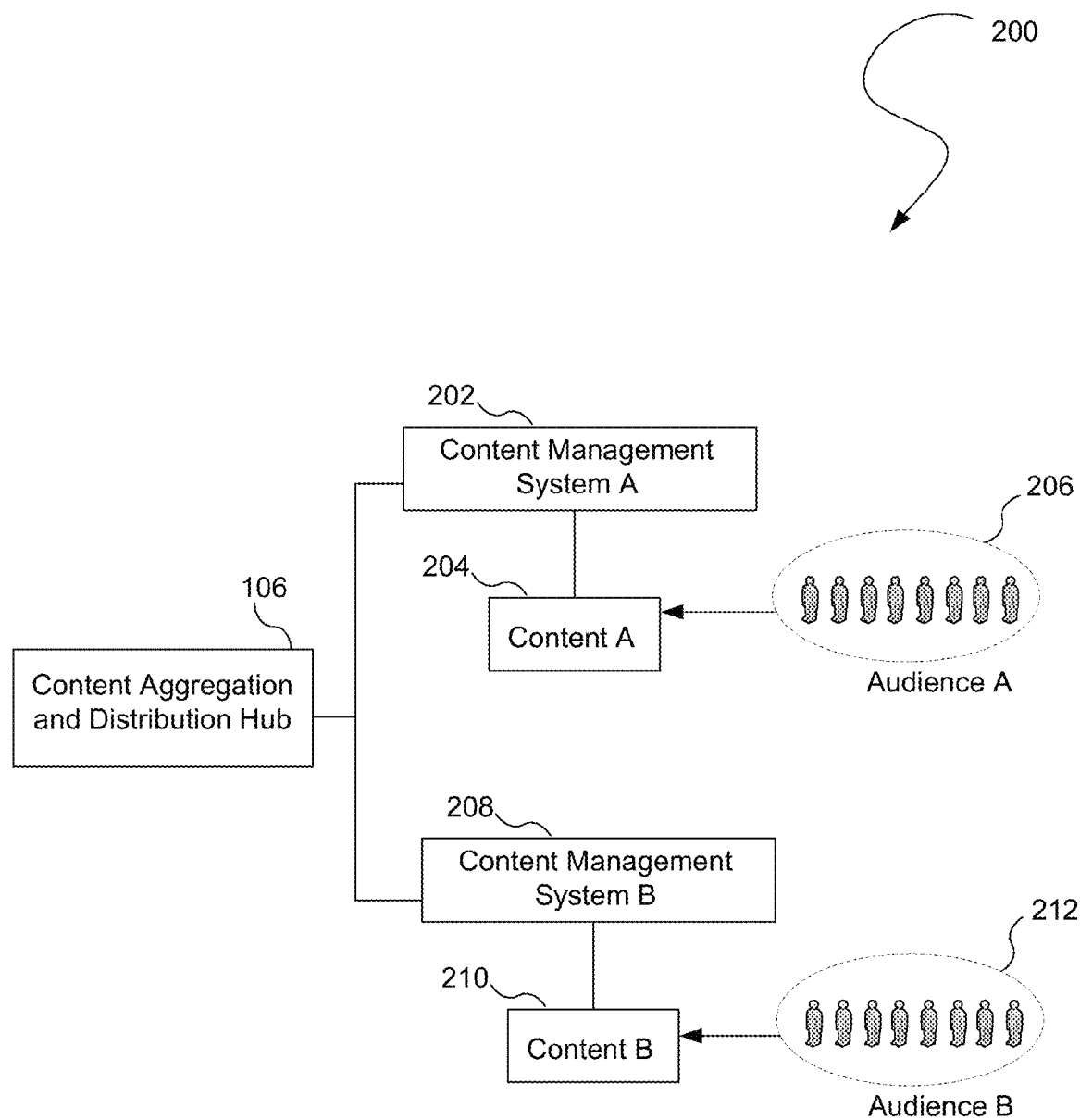
FIG. 2 illustrates an example of a configuration in which the content modification and interaction content modification and interaction hub illustrated in FIG. 1 interacts with multiple content management systems.

FIG. 2 illustrates an example of a configuration 200 in which the content modification and interaction content modification and interaction hub 106 illustrated in FIG. 1 interacts with multiple content management systems. For example, the content modification and interaction content modification and interaction hub 106 may interact with a content management system A 202 and a content management system B 210. Two content managements systems are illustrated for illustrative purposes as a single content management system or more than two content management systems may be utilized. The content management system 202 may store corresponding content 204. An audience of members 206 may interact with the content 204. For example, the audience of members 206 may participate in the outcome of a movie, video game, or the like. The content management system 202 receives inputs from the audience of members 206. Based upon those inputs and the rules received from the content modification and interaction content modification and interaction hub 106, the content management system 202 may then perform certain actions for characters in the content 204, provide incentives to the particular user, e.g., point rewards, or the like. Further, the content management system B 208 may store corresponding content 210 and receive inputs from an audience of members 212. The content management system B 208 may then interact with the content modification and interaction content modification and interaction hub 106.

Figure 3:
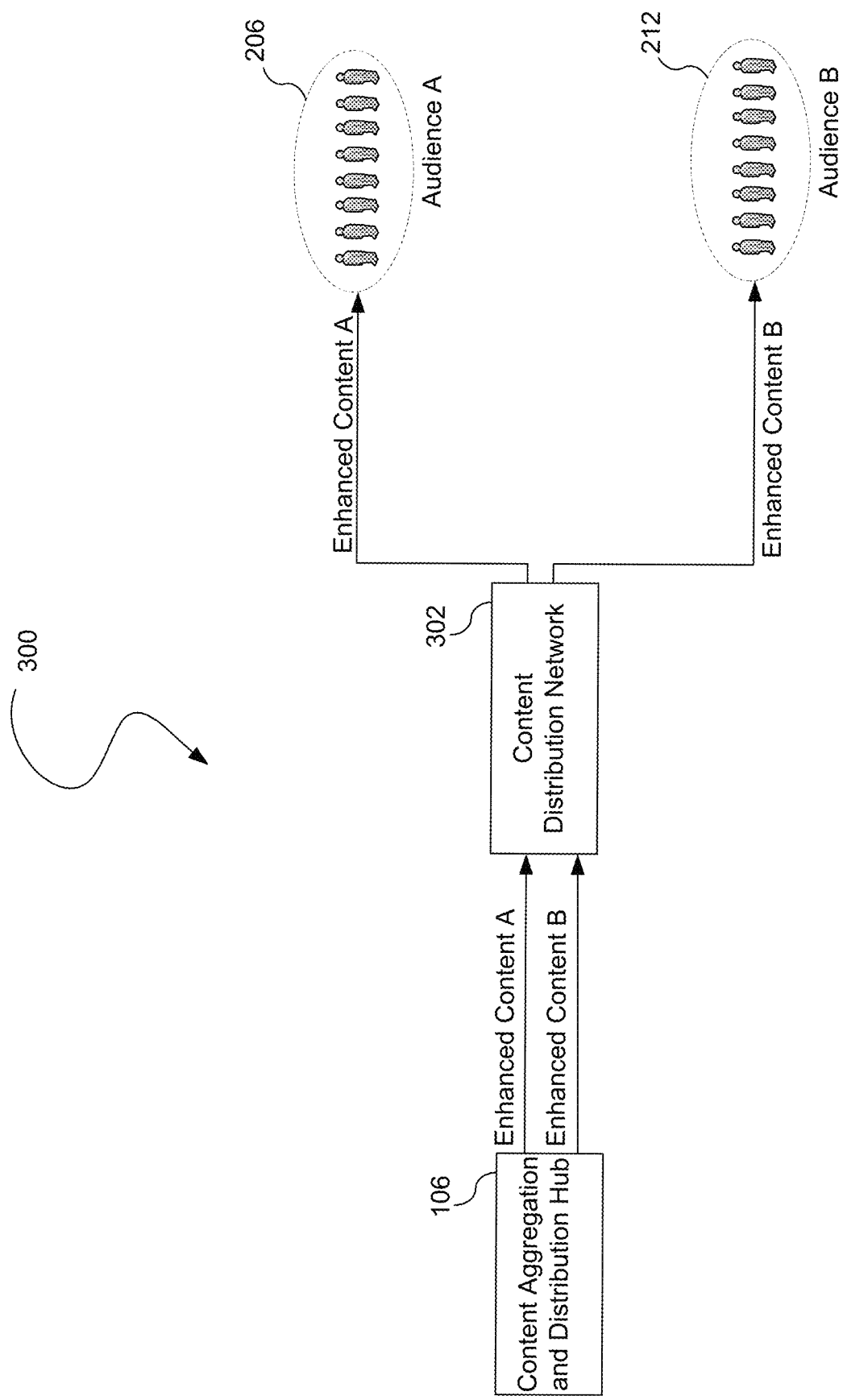
FIG. 3 illustrates an example of a configuration that enhances content based upon the inputs received in FIG. 2.

FIG. 3 illustrates an example of a configuration 300 that enhances content based upon the inputs received in FIG. 2. For example, the content modification and interaction content modification and interaction hub 106 enhances the content A 204 based upon the inputs received from the members of the audience A 206. The content modification and interaction content modification and interaction hub 106 then sends the enhanced content A to a content distribution network 302. The content distribution network 302 then provides the enhanced content A to members of an audience A 206 for viewing, listening, and/or the like. As another example, the content modification and interaction content modification and interaction hub 106 enhances the content B 210 based upon the inputs received from the members of the audience B 212. The content modification and interaction content modification and interaction hub 106 then sends the enhanced content to the audience B 212. The configuration 300 may or may not be utilized. For example, immersive video may be distributed by utilizing the configuration 300. Other types of content may be stored by the content management system 124 without utilizing the configuration 300. In such an instance, a content distribution network may or may not be utilized.

Figure 4:
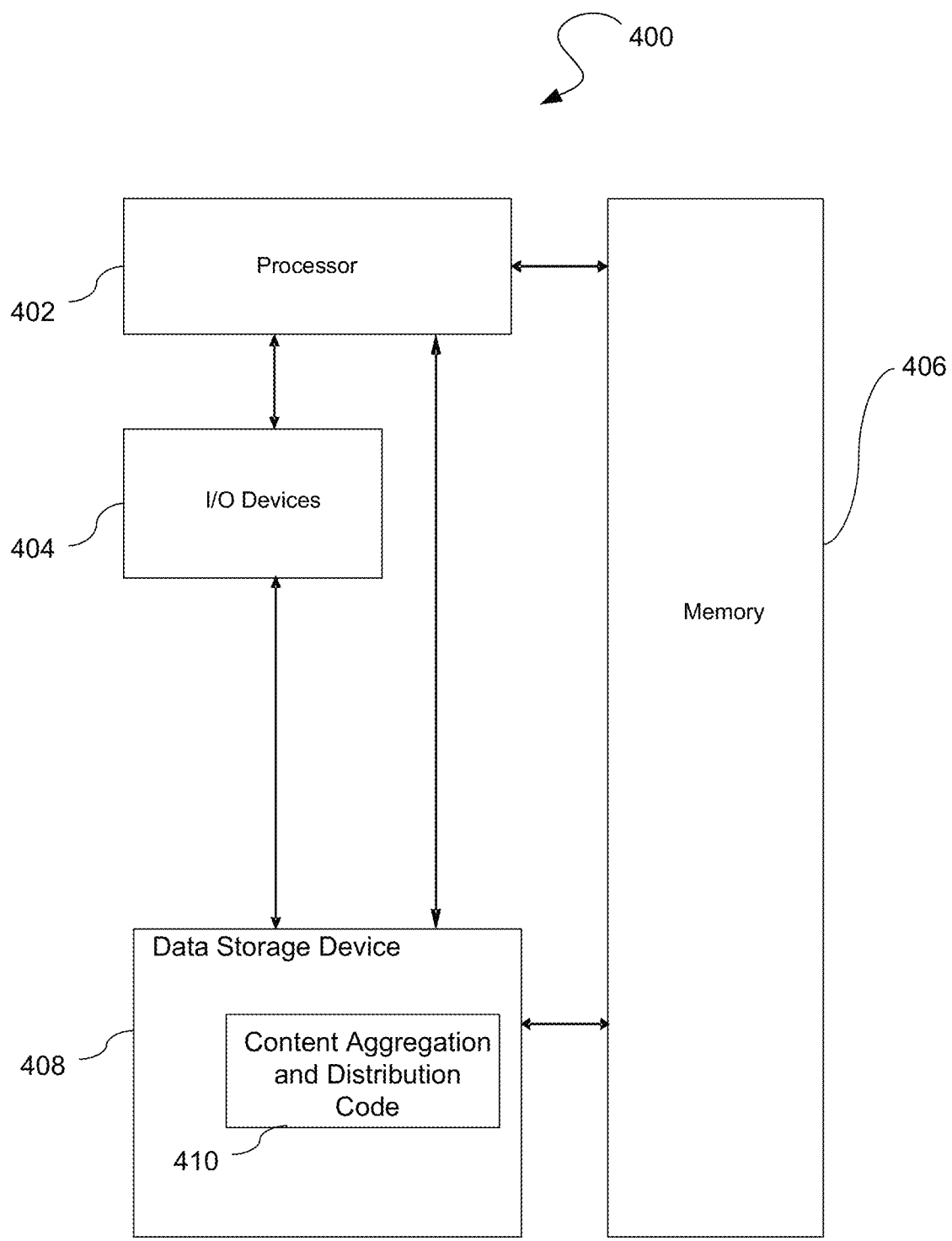
FIG. 4 illustrates a content modification and interaction content modification and interaction configuration.

FIG. 4 illustrates a content modification and interaction content modification and interaction configuration 400. In one embodiment, the content modification and interaction content modification and interaction configuration 400 is implemented utilizing a general purpose computer, e.g., a server computer, or any other hardware equivalents. Thus, the content modification and interaction content modification and interaction configuration 400 comprises a processor 402, various input/output devices 404, e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device such as a keyboard, a keypad, a mouse, and the like, or a microphone for capturing speech commands, a memory 406, e.g., random access memory ("RAM") and/or read only memory (ROM), a data storage device 408, and content modification and interaction code 410.

The content modification and interaction code 410 may be implemented as a set of computer readable instructions that may be utilized by the processor 402 in the memory 406 to perform various actions associated with content modification and interaction. The content modification and interaction code 410 may be represented by one or more software applications, where the software is loaded from a storage medium, e.g., a magnetic or optical drive, diskette, or non-volatile memory, and operated by the processor 410 in the memory 406 of the computer. As such, the content modification and interaction code 410 including associated data structures of the present disclosure may be stored on a computer readable medium, e.g., RAM memory, magnetic or optical drive or diskette and the like. As an example, the content modification and interaction code 410 may be implemented as an application that is downloaded onto a smartphone or tablet device.

Alternatively, the content modification and interaction code 410 may be implemented as one or more physical devices that are coupled to the processor 402. The content modification and interaction code 410 may be utilized to implement any of the configurations herein.

The content modification and interaction content modification and interaction configuration 400 may be implanted on a computing device. A computing device may be a server computer, personal computer ("PC"), laptop, notebook, smartphone, tablet device, or the like.

Figure 5:
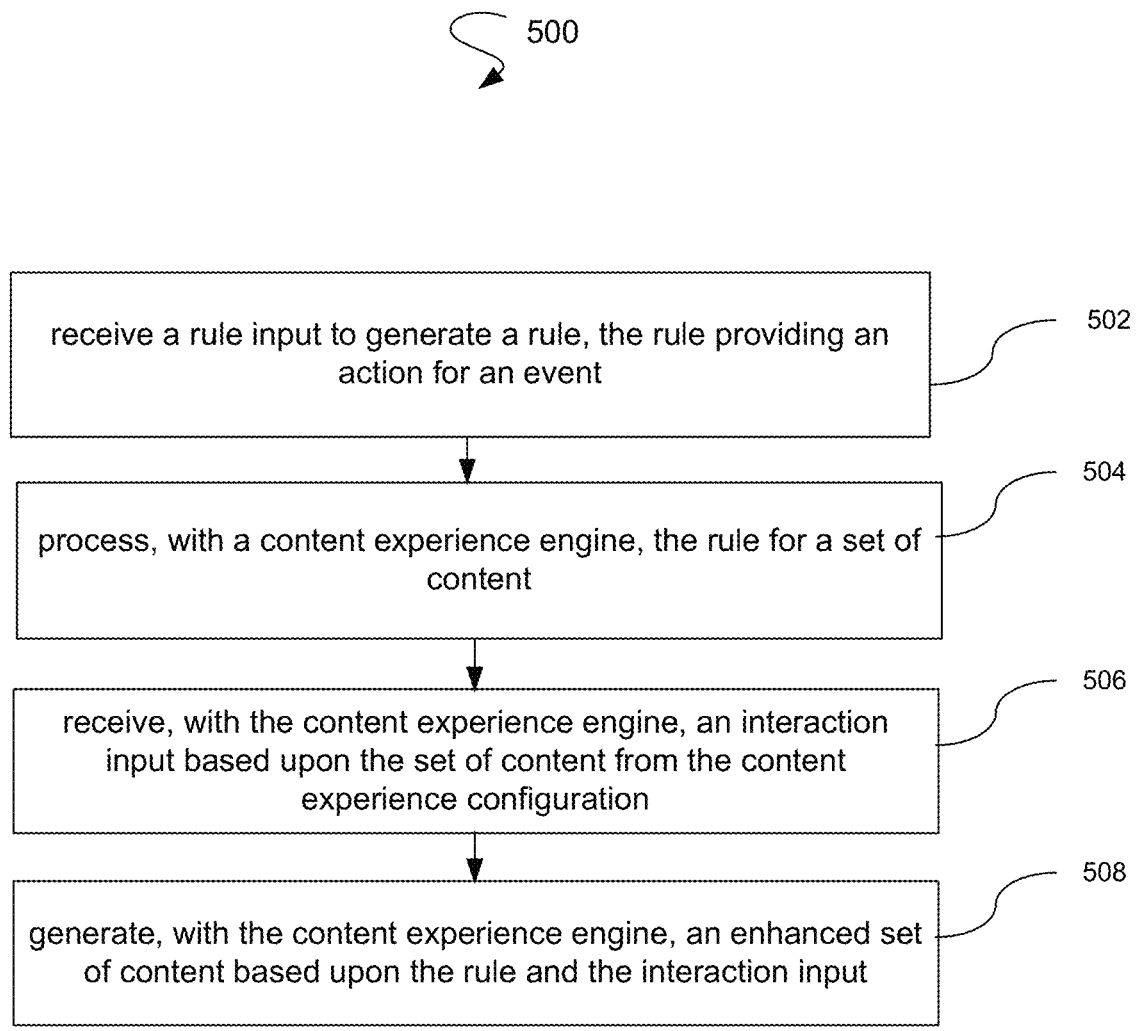
FIG. 5 illustrates a process that is utilized to provide content modification and interaction.

FIG. 5 illustrates a process 500 that is utilized to provide content modification and interaction. At a process block 502, the process 500 receives a rule input to generate a rule. The rule provides an action for an event. Further, at a process block 504, the process 500 processes, with a content experience engine, the rule for a set of content. In addition, at a process block 506, the process 500 receives, with the content experience engine, an interaction input based upon the set of content from the content experience configuration. At a process block 508, the process 500 generates, with the content experience engine, an enhanced set of content based upon the rule and the interaction input. In an alternative embodiment, the process 500 may schedule, with an event scheduler, delivery of the rule to a content experience configuration if delayed execution is specified by the rule.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above.

It is understood that the processes, systems, apparatuses, and compute program products described herein may also be applied in other types of processes, systems, apparatuses, and computer program products. Those skilled in the art will appreciate that the various adaptations and modifications of the embodiments of the processes, systems, apparatuses, and compute program products described herein may be configured without departing from the scope and spirit of the present processes and systems. Therefore, it is to be understood that, within the scope of the appended claims, the present processes, systems, apparatuses, and compute program products may be practiced other than as specifically described herein.

We claim:

1. A system comprising:
a rule editor that receives a rule input to generate a rule, the rule providing an action for an event; and
a content experience engine that processes the rule for a set of content, receives an interaction input based upon the set of content from a content experience configuration, and generates an enhanced set of content based upon the rule and the interaction input, the set of content being passive content without a user interaction capability, the enhanced set of content being a modified version of the set of content that provides a user interaction capability during playback.

2. The system of claim 1, wherein the rule is an event.

3. The system of claim 2, wherein the event is selected from the group consisting of brand conversion events, brand referral events, code entry events, friend request events from a character in the content, friend request events to a character in the content, immersive video, message from a character in the content, message to a character in the content, internal experience content, external experience content, player registration, message event from a member of an audience, message event to a member of the audience, task event, user generated content upload event, and voice input from a member of the audience.

4. The system of claim 1, wherein the rule is an incentive.

5. The system of claim 4, wherein the incentive is selected from the group consisting of profile completion, event completion, friending, forum participation, regular login, and player recruitment.

6. The system of claim 1, wherein the interactive input is received from an audience member that interacts with the set of content.

7. The system of claim 1, further comprising a database that stores event definitions.

8. The system of claim 1, further comprising a database that stores analytics performed by the content experience engine based upon the interactive input.

9. The system of claim 1, further comprising a database that stores a list of members of an audience.

10. The system of claim 1, wherein the set of content is passive.

11. A computer program product comprising a non-transitory computer useable storage device having a computer readable program, wherein the computer readable program when executed on a computer causes the computer to:
receive a rule input to generate a rule, the rule providing an action for an event;
process, with a content experience engine, the rule for a set of content;
receive, with the content experience engine, an interaction input based upon the set of content from the content experience configuration; and
generate, with the content experience engine, an enhanced set of content based upon the rule and the interaction input, the set of content being passive content without a user interaction capability, the enhanced set of content being a modified version of the set of content that provides a user interaction capability during playback.

12. The computer program product of claim 11, wherein the rule is an event.

13. The computer program product of claim 12, wherein the event is selected from the group consisting of brand conversion events, brand referral events, code entry events, friend request events from a character in the content, friend request events to a character in the content, immersive video, message from a character in the content, message to a character in the content, internal experience content, external experience content, player registration, message event from a member of an audience, message event to a member of the audience, task event, user generated content upload event, and voice input from a member of the audience.

14. The computer program product of claim 11, wherein the rule is an incentive.

15. The computer program product of claim 14, wherein the incentive is selected from the group consisting of profile completion, friending, forum participation, regular login, and player recruitment.

16. The computer program product of claim 11, wherein the rule input is a rule parameter.

17. The computer program product of claim 11, wherein a database stores event definitions.

18. The computer program product of claim 11, wherein a database stores analytics performed by the content experience engine based upon the interactive input.

19. The computer program product of claim 11, wherein a database stores a list of members of an audience.

20. The computer program product of claim 11, wherein the set of content is interactive.

21. A method comprising:
receiving a rule input to generate a rule, the rule providing an action for an event;
processing, with a content experience engine, the rule for a set of content;
receiving, with the content experience engine, an interaction input based upon the set of content from the content experience configuration; and
generating, with the content experience engine, an enhanced set of content based upon the rule and the interaction input, the set of content being passive content without a user interaction capability, the enhanced set of content being a modified version of the set of content that provides a user interaction capability during playback.

* * * * *